United States Patent Office 3,089,816
Patented May 14, 1963

---

3,089,816
LEMACIDINE AND PROCESS FOR ITS MANUFACTURE
Ernst Gaeumann, Zurich, and Fritz Benz, Binningen, Switzerland, assignors to Ciba Corporation, a corporation of Delaware
No Drawing. Filed Sept. 26, 1958, Ser. No. 763,435
Claims priority, application Switzerland Oct. 29, 1957
12 Claims. (Cl. 167—65)

This invention relates to a new water-soluble antibiotic having basic properties, which is hereinatfer referred to as lemacidine, and also to its components B1, B2 and B3 and salts thereof, and also to pharmaceutical preparations which contain these compounds, and the invention also provides a process for the manufacture of these substances or mixtures of these substances.

Antibiotic lemacidine is produced by cultivating an Actinomyces of the species *Streptomyces venezuelae*, strain A 9692. A culture of the microorganism has been deposited with the U. S. Department of Agriculture, Agricultural Research Service, Peoria, Illinois, and assigned the number NRRL 2718. This strain was isolated from a soil sample collected at Roche, Canton Waadt (Switzerland), and is kept in our laboratory and also at the Federal Institute of Technology, Institut fuer spezielle Botanik, Zurich, under the above designation.

*Streptomyces venezuelae* A 9692 forms a pink to cinnamon brown air mycelium and has conidial chains, which are a typical feature of the genus Streptomyces. The spore chains are stiff, straight or slightly wavy, no spiral or whorl formation could be observed. The individual spores are smooth. No pronounced exopigment is formed. Peptone-containing media are colored black-brown melanoid. The growth is relatively little dependent on temperature, the mould developing well at 18° C. and 40° C., although the optimum is between 25° C. and 32° C.

For the purpose of further characterization, the growth of strain A 9692 in various nutrient media is described below. The nutrient media No. 1 to 7 and 10 are prepared as described by W. Lindenbein, Arch. Mikrobiol., vol. 17, page 361 (1952).

(1) Synthetic agar: Growth thin, cloud-like and light yellow. Air mycelium velvety and pale carmine.
(2) Synthetic solution: Sparse growth. Sediment, flocks, light yellow.
(3) Glucose-agar: Growth thin, cloud-like and light brown. No air mycelium. Substratum dark brown.
(4) Glucose-asparagin-agar: Growth thin, cloud-like and pale brown. Air mycelium velvety, initially chalk white and later cinnamon brown.
(5) Calcium malate-agar: Growth sparse, point-like and light yellow. Air mycelium snow white.
(6) Stab gelatine (18° C.): Growth superficial, cloud-like and light brown. Substratum dark brown. Liquefaction after 14 days=1.5 centimeters.
(7) Starch plate: Growth thin cloud-like and light yellow. Air mycelium initially snow white, later pale carmine. Hydrolysis after 10 days=0.9–1.2 centimeters.
(8) Potatoes: Growth very luxuriant, initially colud-like and light yellow, later wrinkled and light brown. Air mycleium cinnamon brown. Substratum dark brown.
(9) Carrots: Growth very sparse, point-like and light yellow. No air mycelium.
(10) Litmus milk: Growth good, pellicle light yellow. Substratum blue. Peptonisation slow. Coagulation good.

The morphological and physiological characteristics of strain A 9692 are those of the species *Streptomyces venezuelae* Ehrlich et al. It is known that *Streptomyces venezuelae* produces an antibiotic namely chloromycetin. The latter antibiotic is distinguished from the new antibiotic lemacidine in that, in contradistinction to antibiotic lemacidine, it can be extracted from the culture filtrate by means of an organic solvent and has no basic properties.

The present invention, so far at is includes the production of antibiotic lemacidine is not limited to the use of *Streptomyces venezuelae* A 9692 or other strains corresponding to its description, but also includes the use of variants of these organisms such as are obtained, for example, by selection or mutation, especially under the action of ultra-violet rays or X-rays or of nitrogen mustard oils.

In order to obtain the antibiotic lemacidine a strain of *Streptomyces venezuelae* having the properties of Streptomyces A 9692 is aerobically cultivated in an aqueous nutrient solution containing a source of carbon and of nitrogen and inorganic salts, until the solution exhibits a substantially antibiotic action, and then antibiotic lemacidine is isolated.

The cultivation is carried out aerobically, for example, in a quiescent surface culture or advantageously immersed while agitating or stirring with air or oxygen in agitating bottles or the known fermenters. Suitable temperatures are within the range of 18° C. and 40° C. The nutrient solution exhibits a substantially antibacterial action, usually after 1.5 to 5 days.

As assimilable sources of carbon there may be mentioned, for example, glucose, saccharose, lactose, starches, mannitol and glycerine. As nitrogenous nutrients and, if desired, growth-promoting substances there may be mentioned: Amino-acids, peptides and proteins, and also degradation products thereof, such as peptone or tryptone and also meat extracts, water-soluble constituents of cereal grains, such as maize and wheat, of distillation residues from the manufacture of alcohol, of yeasts, beans, especially those of soya plants, of seeds, for example, those of cotton plants, etc., and also nitrates. Among other inorganic salts the nutrient solution may contain for example, chlorides, carbonates, or sulfates of alkali metals, alkaline earth metals, magnesium, iron, zinc and manganese.

Antibiotic lemacidine obtained by the process of this invention is a water-soluble substance, which as shown by paper chromatography consists of about three probably closely related compounds. It is completely insoluble in organic solvents, and especially lipoid solvents. The antibiotic is basic and forms salts, some of which, for example, the hydrochloride, are soluble in certain organic solvents, such as lower aliphatic alcohols. When cultivated in aqueous media the antibiotic is found almost completely in the nutrient solution, and the mycelium separated from the solution exhibits practically no antibiotic activity.

By virtue of these properties antibiotic lemacidine cannot be recovered by extraction from a culture solution with an organic solvent. It can be recovered under neutral or weakly alkaline conditions by means of adsorption agents and eluted from the adsorbate by means of acid elution liquids, advantageously having a pH value below 4. As adsorption agents there may be used, on the one hand, active charcoals, for example, Norit and, on the other, cation-exchangers, namely those which contain carboxyl groups, for example, the exchange resin known in commerce as Amberlite IRC–50 (a methacrylic carboxylic acid cationic exchange resin described in U.S. Patent No. 2,340,111).

When active charcoal is used as adsorption agent there may be used as elution liquids either acid aqueous solutions or water-miscible solvents, such as lower aliphatic alcohols or ketones, containing an acid. A mixture of equal parts by volume of methanol and 1 N-formic acid has been found especially advantageous. As large amounts of impurities, some of which are colored, are adsorbed from the culture solution, in addition to the antibiotic, it is of advantage to wash the adsorption column, before elution of the antibiotic under otherwise unchanged conditions, with ethanol, whereby a large amount of the accompanying substances are removed but the antibiotic is not eluted. From the acid eluate a strongly enriched preparation of the antibiotic can be obtained in the form of a white powder by concentrating the eluate in vacuo to a small volume, whereby the organic solvent and the greater part of the formic acid are removed, and then adding acetone to the aqueous concentrate, advantageously after the latter has been diluted with 4–5 volumes of methanol, and washing the resulting precipitate with acetone and finally drying it. Since the charcoal eluate, especially one from a culture obtained with a nutrient solution containing calcium carbonate, contains substantial amounts of calcium ions, it is of advantage, prior to the precipitation of the antibiotic, to separate the calcium from the concentrate by means of oxalic acid.

In order to adsorb the antibiotic with a cation-exchanger it is of advantage to use the latter in the H-form. The elution is carried out with a dilute aqueous acid, if desired, after first washing the calcium with distilled water, whereby inactive accompanying substances are eliminated. 0.2 N-hydrochloric acid is especially suitable as an elution agent. The antibiotic is present in the eluate in the form of a salt. Cation-exchange eluates may be used as such or after being concentrated in vacuo, if desired, after previous neutralization, for the production of more highly enriched preparations of the antibiotic.

In order to obtain pure antibiotic lemacidine from products that have been pre-purified by adsorption on charcoal or an ion-exchanger there is added to an aqueous solution of the product adjusted to a pH value of 5.6 to 7.0 a sufficient volume of an aqueous solution of a salt of an azo-dyestuff containing sulfonic acid groups to bring about complete precipitation, and the resulting sparingly-soluble dyestuff salt of the antibiotic is isolated.

By using as the azo-dyestuff salt the sodium salt of 4'-dimethylamino-azo-benzene-4-sulfonic acid known in commerce as helianthine or Orange III, the dyestuff salt (helianthate) of antibiotic lemacidine separates out wholly or partially in crystalline form. The helianthate of the antibiotic can be recrystallized from water or methanol or a mixture of these two solvents, or from formamide and water. When recrystallized it is macroscopically a red-brown powder. When viewed under the microscope it is in the form of yellow irregularly shaped layered lamellae or needles, which melt at 202–203° C. with decomposition.

In order to recover the antibiotic from the dyestuff salt, the salt is reacted in an aqueous or alcoholic medium with the salt of an inorganic or organic acid and an organic base, whereby the salt of the acid in question and the dyestuff salt of the base are formed. By using, for example, triethylamine sulfate for this reaction and carrying it out with an aqueous suspension of the antibiotic helianthate, there is obtained the water-soluble sulfate of the antibiotic and the insoluble helianthate of triethylamine. By adding a sufficient amount of methanol to the reaction solution the latter insoluble salt dissolves, whereas the antibiotic sulfate, which is soluble in water but completely insoluble in lower alcohols, separates out and can be isolated, for example, by filtration. The reaction may also be carried out in an alcoholic or aqueous alcoholic solution, whereby the sulfate precipitates out immediately and can be separated from the dyestuff solution. The sulfate of antibiotic lemacidine so obtained is a colorless powder of high antibiotic activity which is easily soluble in water and formamide but insoluble in organic solvents such as alcohols and ketones.

From the sulfate the hydrochloride, for example, of the antibiotic can be obtained by reaction in aqueous solution with barium chloride and isolation from the solution, freed from barium sulfate, in the form of a hardly colored powder easily soluble in water or methanol, but sparingly soluble in ethanol. Alternatively, the hydrochloride can be obtained directly from the helianthate of the antibiotic, by adding to a solution or suspension of the latter in methanol an excess of concentrated hydrochloric acid or of a solution of gaseous hydrogen chloride in methanol, and precipitating the hydrochloride formed with ether and isolating it. In order to remove small amounts of colored impurities from the hydrochloride produced in this manner, a methanolic solution of the hydrochloride is filtered through a column of active charcoal, advantageously gas black, and, after evaporating the solvent the hydrochloride is recovered from the filtrate in the form of a pure white powder, which when the evaporation is very slow separates from the aqueous or methanolic solution partially in crystalline form.

Antibiotic lemacidine can also be obtained in pure form by precipitating it in the form of a sparingly soluble salt from an aqueous solution by means of an organic acid, for example, of the type of picric acid, such as picric acid itself or styphnic acid or picrolonic acid. The picrate or styphnate first precipitates out in liquid form as oily droplets, which upon standing slowly solidify at room temperature. It has not yet been possible to crystallise these salts. On the other hand, the picrolonate can be crystallized. The latter forms yellow rodlets united in irregular clusters, which melt with decomposition at 202° C. after first sintering. These sparingly soluble salts can be converted into other salts by treatment with acids, for example, hydrochloric acid or sulfuric acid, in an aqueous medium or in an organic solvent miscible with water, such as methanol or acetone, and isolated as such. By these methods of enrichment the antibiotic can be obtained, for example, from the sulfate purified by way of the helianthate, or from eluates obtained from charcoal adsorbates or cation-exchange adsorbates. A further crystalline sparingly water-soluble salt of antibiotic lemacidine is the reineckate, which crystallizes in irregular plates and has a decomposition point of 198–200° C. The free base of antibiotic lemacidine can easily be obtained from its salts, from the sulfate, for example, by reaction in an aqueous medium with barium hydroxide, neutralization of the excess baryta with carbon dioxide and separation of the barium carbonate and barium sulfate precipitate, and isolation of the antibiotic base by freeze drying. It is simpler to prepare the base from its salts with the use of a strongly basic anion-exchanger, for example, the HO-form of the product known in commerce as "Dowex-2" (a polystyrene dimethyl ethanol benzylammonium (37% $H_2O$) anionic exchange resin described in U.S. Patent No. 2,614,099).

Antibiotic lemacidine is a colorless amorphous base, which is easily soluble in water and aqueous media, but is insoluble in organic solvents. The aqueous solution of the base has an alkaline reaction. A solution of 1% strength of this product prepared with an ion-exchanger has a pH value of 8.6.

Antibiotic lemacidine forms salts with acids, of which, for example, the colorless sulfate and hydrochloride are very easily soluble in water. The hydrochloride is also soluble in lower aliphatic alcohols, especially methanol.

By very slow evaporation of an aqueous or methanolic solution of the hydrochloride of the antibiotic, the hydrochloride is obtained in crystalline form. It gives the following microanalytical data: C=37.3%, H=7.0%, N=16.8%, Cl=18.1%, and the specific rotation $$[\alpha]_D^{20} = +24.4°$$

(c.=1.0 in water). The figures for the sulfate of the antibiotic are: C=35.0%, H=6.9%, N=11.6%, S=8.3%; specific rotation $[\alpha]_D^{27}=+56°$ (c.=0.95 in water). The dyestuff salt of the base with 4'-dimethylamino-azobenzene-4-sulfonic acid (helianthate) is sparingly soluble in aqueous media and in alcoholic media. From hot saturated solutions it separates out in a form, which when viewed under the microscope, consists of yellow colored irregular shaped, layered lamellae, and also needles which have a decomposition point of 202–203° C. after recrystallization.

Other salts of antibiotic lemacidine are obtained, for example, from acetic acid, palmitic acid or succinic acid, citric acid, pantothenic acid, ascorbic acid or amino acids such as leucine or methionine.

Th hydrochloride of antibiotic lemacidine has a positive ninhydrine reaction, a weakly positive biuret and Elson-Morgan reaction, and the Maltol- and Sakeguchi-test is negative. As has been found by comparative paper-chromatography, it differs from the known water-soluble colorless antibiotics active against gram-positive and gram-negative bacteria.

The hydrochloride of antibiotic lemacidine can be split up by paper chromatography into the three probably closely related components B1, B2 and B3. By using, for example, as solvent system a mixture of 3 parts of ethanol and 1 part of water and to which 0.2% of sodium chlorid has been added, and taking the $R_f$-value (=$R_B$) of the fastest flowing component B3 (reference substance) as being 1, the other two components B1 and B2 have the $R_B$ values 0.34 and 0.61, respectively.

Antibiotic lemacidine has a high antibiotic activity towards various test organisms. By using as test method a series of in vitro dilutions (to the power of 10) in glucose broth, the incubation being carried out at 37° C. for 24 hours, the following inhibiting concentrations were obtained.

| Test organism | Inhibiting concentration, µg/cm.³ |
| --- | --- |
| Micrococcus pyogenes, var. aureus | 10 |
| Micrococcus pyogenes, var. aureus, Penicillin-resistant | 10 |
| Streptococcus pyogenes | 10 |
| Streptococcus viridans | 10 |
| Corynebacterium diptheriae | 1 |
| Escherichia coli | 1 |
| Escherichia coli, Streptomycin-resistant | 10 |
| Escherichia coli, Chloromycetin-resistant | 10 |
| Salmonella typhosa | 10 |
| Salmonella schottmuelleri | 1 |
| Shigella sonnei | 10 |
| Pseudomonas aeruginosa | 1 |
| Klebsiella type A | 10 |
| Pasteurella pestis | 1 |
| Vibrio cholerae El Tor | 10 |
| Bacillus megatherium | 0.1 |
| Bacillus subtillis | 10 |
| Candida vulgaris | 10 |
| Endomyces albicans | 10 |

Antibiotic lemacidine is also active in vivo. When mice infected with *Micrococcus pyogenes*, var. *aureus* were subcutaneously injected 5 times at the rate of 1 milligram per kilogram body weight 100% of survival were observed. When administered in the same manner at the rate of 5 milligrams per kilogram body weight, a similar result was obtained on mice infected with *Escherichia coli*, and an effect was also obtained on mice infected with *Salmonella typhi murium*.

Antibiotic lemacidine has a certain toxicity, although, for example, subcutaneous administration of the hydrochloride of the antibiotic to mice at the rate of 50 milligrams per kilogram body weight was tolerated. The sulfate and the pantothenate are somewhat less toxic than the hydrochloride, while the salt of the L(+) ascorbic acid and the salts of the amino acids L(−) leucine and L(−) methionine are considerably less toxic than the hydrochloride.

The antibiotic, its components B1, B2 and B3 and salts thereof are useful as medicaments, for example in the form of pharmaceutical preparations. The preparations contain the compound in admixture with a pharmaceutical organic or inorganic carrier suitable for enteral, parenteral or local administrations. For making the carriers there are used substances which do not react with the new compounds, for example, gelatine, lactose, starches, magnesium stearate, talc, vegetable oils, benzyl alcohols, gums, polyalkylene glycols, white petroleum jelly, cholesterol or other known carriers for medicaments. The pharmaceutical preparations may be, for example, in the form of tablets, dragees, powder, salves, creams, suppositories or in liquid form as solutions, suspensions or emulsions. If desired, they may be sterilized and/or may contain preserving, stabilising, wetting or emulsifying agents. They may also contain other therapeutically valuable substances.

The following examples illustrate the invention:

*Example 1*

Streptomyces A 9692 is cultivated by the immersion method. There is used a nutrient solution, which contains, per liter of tap water, the following ingredients:

| | Grams |
| --- | --- |
| Glycerine | 20 |
| Soya bean meal | 10 |
| Sodium chloride | 5 |
| Sodium nitrate | 1 |
| Calcium carbonate | 10 |

The nutrient solution is sterilised in an inoculation flask or in a fermenter for 20–30 minutes under one atmosphere gauge pressure. The sterilized nutrient solution has a pH value of 7.0 to 7.5. The nutrient solution is inoculated with up to 10% of a partially sporulating vegetative culture of the organism. Incubation is carried out while shaking or stirring well at 21 to 27° C, cultures in fermenters being aerated with about 1 part by volume of sterile air per volume of solution per minute. After 30–50 hours of incubation the culture solution contains the highest inhibiting value towards the organisms (*B. megatherium, Esch. coli, Candida vulgaris*). The cultivation is interrupted and the mycelium, which is only weakly active, and also other solid constituents are separated from the solution containing the antibiotic by filtering or centrifuging, about 1% of a filtration assistant, for example "Hyflo Supercel" (an infusorial earth) being added to the culture solution before filtration, if desired. The pH value of the culture filtrate usually does not differ or differs little from that of the sterilized nutrient solution. By using, instead of the aforesaid nutrient solution, a solution containing, per liter of tap water, one of the mixtures of nutrients given under (*a*) to (*g*) below, a similar high antibiotic action is obtained after analogous cultivation and working up of the culture filtrate. Instead of adding Hyflo Supercel or another such filtration assistant, rapid filtration of the culture solution can be achieved by adding to the solution, before filtration, hydrochloric acid to produce a pH value of 5 and then adding an aqueous solution of aluminum sulfate of 0.5% strength.

The nutrient solutions contain the following ingredients, per liter of water:

(*a*)

| | Grams |
| --- | --- |
| Glucose | 20 |
| Soya bean meal | 40 |
| Distillers' solubles | 5 |
| Sodium chloride | 20 |
| Calcium carbonate | 10 |

(*b*)

| | |
| --- | --- |
| Glucose | 10 |
| Soya bean meal | 10 |
| Corn steep liquor | 20 |
| Sodium chloride | 5 |
| Sodium nitrate | 1 |
| Calcium carbonate | 10 |

(c)

| | |
|---|---|
| Glucose | 10 |
| Peptone | 5 |
| Meat extract (Oxo Lab Lemco) | 3 |
| Sodium chloride | 5 |
| Calcium carbonate | 10 |

(d)

| | |
|---|---|
| Glucose | 10 |
| Distillers' solubles | 10 |
| Sodium chloride | 5 |
| Sodium nitrate | 1 |
| Calcium carbonate | 10 |

(e)

| | |
|---|---|
| Mannitol | 20 |
| Distillers' solubles | 20 |
| Sodium chloride | 3 |
| Sodium nitrate | 1 |

(f)

| | |
|---|---|
| Malt extract | 20 |
| Distillers' solubles | 20 |
| Sodium chloride | 5 |
| Sodium nitrate | 1 |

(g)

| | |
|---|---|
| Lactose | 20 |
| Distillers' solubles | 20 |
| Sodium chloride | 5 |
| Sodium nitrate | 1 |

The filtrate or centrifugate of a culture of Streptomyces A 9692 obtained as described above usually has a pH value of 7.0 to 7.5. If this is not the case, the pH value is adjusted to within that range by means of a 10 N-solution of caustic soda, prior to the subsequent enrichment of the new antibiotic. In order to adsorb the antibiotic 1% of active charcoal (Norit) is added to the weakly alkaline filtrate, and the mixture is stirred mechanically for one hour, during which the whole of the antibiotically active substance is adsorbed by the charcoal. The latter is separated from the completely inactive almost water-clear solution by filtration advantageously with the addition of a filtration assistant, for example, Hyflo Supercel.

In addition to the antibiotic, the charcoal also adsorbs large amounts of other organic antibiotically inactive materials, principally strongly colored degradation products from the nutrient solution, and also inorganic salts. These accompanying substances are advantageously removed from the charcoal before elution of the antibiotic. For this purpose the charcoal, after it has been filtered off and while still moist, is introduced into five times its weight of ethanol of 95% strength and the suspension is stirred for ½ hours. The charcoal washed in this manner can easily be separated from the washing liquor by filtration. The brown colored filtrate exhibits no antibiotic activity.

Elution of the new antibiotic is carried out by means of acidified aqueous methanol, advantaegously with a mixture of equal parts by volume of methanol and 1 N-formic acid, 2 cc. of the elution liquid being used for each gram of adsorption agent. The suspension is well stirred mechanically for ½ hour, then filtered, and the charcoal residue is extracted three times in the same manner. The eluates, of which only the first is slightly yellowish and the others are colorless, exhibit the whole of the antibiotic activity. They are combined and concentrated in vacuo at a low bath temperature, for example, of 40–60° C., to 1/100 of the original volume, during which, in addition to the methanol and a large amount of water, the greater part of the formic acid is removed. The pH value of the yellowish colored, but thinly liquid, concentrate is usually 4.

The concentrate, especially when the nutrient solutions given in the first paragraph of this example and the nutrient solutions (a) to (d) are used, contain large amounts of calcium. The calcium is removed in the form of its sparingly soluble oxalate by adding an aqueous solution of oxalic acid of 10% strength to the concentrate while stirring. The aliquot amount of oxalic acid solution necessary for complete precipitation is accurately determined. For concentrates obtained from culture solutions containing calcium carbonate the necessary quantity of oxalic acid solution is usually between 300 and 500 cc. per liter of concentrate, which corresponds to 3–5 cc. per liter of original culture filtrate, and concentrates from culture solutions having no calcium carbonate addition require less oxalic acid solution.

The antibiotic is recovered from the concentrate, which has been freed from calcium, in the form of a strongly enriched white powder by first diluting the aqueous concentrate with 4–5 volumes of methanol and then precipitating the active material with 20 volumes of acetone. The precipitate is filtered off, washed twice with acetone, and finally freed from residual solvent in vacuo. There is obtained a pure white powder, which exhibits approximately the whole of the antibiotic activity of the culture filtrate. The yield amounts to about 300 milligrams per liter of culture filtrate.

*Example 2*

A considerably greater enrichment of antibiotic lemacidine than that attained by acetone precipitation as described in Example 1 can be achieved by preparing the crystalline helianthine salt of the antibiotic. For this purpose the calcium-free concentrate obtained as described in Example 1 is diluted with 2 volumes of water, the pH value of the solution is adjusted to 6.7 to 7.0 with a 10 N-solution of caustic soda, and, while vigorously stirring, there is added in the form of a thin stream the proportion by volume required for complete precipitation of an approximately saturated aqueous solution of helianthine containing per liter, 3.5 grams of helianthine (Orange III, sodium salt of 4'-dimethylamino-azobenzene-4-sulfonic acid), the precipitating solution being advantageously introduced directly into the antibiotic solution. The proportion by volume of the helianthine solution necessary for complete precipitation is determined by a preliminary test with an aliquot part. Depending on the content of antibiotic this quantity usually varies within the range of 20 to 100 times the amount of undiluted concentrate used. The helianthate formed (helianthine salt of the antibiotic) precipitates for the greater part in crystalline form, that is to say, in the form of thin lamellae and needles. The precipitation solution is allowed to stand for a few hours at a low temperature of about 0° C., during which the precipitate completely settles out. The bulk of the aqueous supernatent solution is then separated by decanting and the precipitate is separated from the remainder by means of a centrifuge. The precipitate is washed by stirring it once with about its own weight of ice cold water, and is then isolated by filtering with suction. The precipitate is again washed twice in the same maner but with acetone. The washed helianthate of the new antibiotic is dried in vacuo. The yield is between 100 and 180 milligrams of helianthate per cubic centimeter of concentrate. The dry product is a red-brown powder, which is rather sparingly soluble in water and also in methanol, but more easily soluble in formamide, and insoluble or very slightly soluble in lipoid solvents, such as acetone, ether, benzene, chloroform and the like. The product can be recrystallized from water or methanol or a mixture of these two solvents, and as viewed under the microscope it then consists of yellow irregularly formed layered lamellae, which melt at 202–203° C. with decomposition.

In order to prepare the sulfate of the new antibiotic from the helianthate, for example, 30 grams of the helianthate in the form of a dry powder are suspended in 150 cc. of water, 33 cc. of an aqueous solution of 80% strength of triethylamine sulfate are added to the suspension, and the mixture is stirred for one hour, during which it slowly becomes brown-red in color due to the formation of the sparingly soluble triethylamine salt of helianthine. The reaction can be considerably accelerated by heating. 20 parts by volume of methanol are then added to the reaction mixture, whereby the sulfate of the antibiotic precipitates out as a white precipitate and triethylamine helianthate dissolves. The antibiotic sulfate, obtained by centrifuging or filtering, is freed from adherent dyestuff by reprecipitation twice from water with methanol, and is again washed with pure methanol, and then dried. It is a pure white amorphous powder which is insoluble in organic solvents and easily soluble in water. The yield amounts to 5.6 grams.

*Example 3*

In order to convert the sulfate of the antibiotic into the hydrochloride of the antibiotic, which is easily soluble both in water and in methanol, the sulfate is dissolved in 10 times its weight of water, and the aqueous solution is treated with a barium chloride solution of 20% strength to cause complete precipitation about 4 cc. of the solution being required per gram of sulfate. The precipitate of barium sulfate is removed by centrifuging, and the hydrochloride is isolated from the colorless supernatant solution by freeze drying. In this manner slightly more than one gram of hydrochloride is obtained per gram of sulfate. In order further to purify the hydrochloride it is dissolved in a small amount of methanol, the concentrated solution is poured on to a chromatographic column of gas carbon, which has been washed with methanol, and the same solvent is used for elutriation. The residue obtained by evaporating the eluate is a pure white powder easily soluble in methanol and in water, which powder, when dissolved in either of these solvents and the solvent is very slowly evaporated, separates out partially in a crystalline form.

Instead of preparing the hydrochloride by way of the sulfate, it can be obtained directly from the helianthate. For this purpose the helianthate is suspended in a dry finely subdivided condition in about 10 times its weight of absolute methanol, 2 parts by volume of a 10 N-methanolic solution of hydrochloric acid are added to the suspension, and then the whole is boiled for a short time. After decolorizing the mixture with a small amount of Norit, it is filtered, the water-clear filtrate is then concentrated in vacuo to about ¼ of its original volume, and the hydrochloride is precipitated from the concentrate with 10–20 parts by volume of ether or acetone.

*Example 4*

The antibiotic obtained as described in Example 2 in the form of its crude sulfate is further purified by way of its picrate as follows:

130 cc. of a saturated aqueous solution of picric acid are slowly run into a well stirred solution of 1 gram of the sulfate in 20 cc. of water, the said quantity of picric acid solution being just sufficient for complete precipitation. The oily precipitate is formed and the latter is separated by centrifuging, washed once with a small amount of saturated picric acid solution and water, and then dried in a vacuum desiccator, whereby the picrate is converted into a solid but noncrystalline mass. The yield amounts to 1.2 grams. In order to convert the picrate of the antibiotic into its hydrochloride, the picrate is dissolved in warm methanol acidified with concentrated hydrochloric acid, and the solution is poured into 10 parts by volume of ether, whereby the insoluble hydrochloride precipitates out as a white mas. The latter is freed from adherent residues of picric acid by dissolving it in the quantity of boiling methanol required for dissolution and precipitation with ether is repeated. There is obtained about 0.6 gram of the pure white pulverulent hydrochloride.

*Example 5*

Instead of purifying the antibiotic by way of its picrate which has not hitherto been crystallized, the pure antibiotic can be obtained, for example, in the form of the hydrochloride by way of the crystalline picrolonate in the following manner:

700 cc. of a concentrated aqueous solution containing per liter 2.4 grams of picrolonic acid are added dropwise in the course of one hour to a solution of 1.0 gram of the sulfate, obtained as described in Example 2, in 100 cc. of water, while stirring. The amorphous precipitate of the picrolonate which separates out is filtered off with suction, and for the purpose of crystallization it is dissolved in 150 cc. of boiling water and the solution is filtered hot. By allowing the filtrate to cool slowly the picrolonate separates out at room temperature partially in a crystalline form. The precipitate is collected on a suction filter, washed with a small amount of ice-cold water, and dissolved in 100 cc. of boiling water for the purpose of recrystallization. From the hot filtered solution the picrolonate then separates out completely in the form of fine yellow rodlets arranged in clusters, which, after being washed with a little cold water and dried in vacuo over phosphorus pentoxide, decompose sharply at 202° C. after sintering. The yield of the twice recrystallized picrolonate is 0.64 gram.

From the picrolonate obtained as described above the pure hydrochloride is obtained by adding 0.6 cc. of a 10 N-solution of gaseous hydrogen chloride in absolute methanol in portions, while vigorously stirring, to a finely dispersed suspension of 0.6 gram of the picrolonate in 10 cc. of ice cold methanol, and when the reaction is complete, the hydrochloride of the antibiotic so formed and which partially separates out is completely precipiltated by adding 20 parts by volume of absolute ether to the reaction mixture. The hydrochloride is filtered off with suction, washed once on the filter with a little ether, and, in order to remove adherent residues of picrolonic acid, is then dissolved in 2 cc. of methanol and again precipitated with ether and washed. The now pure hydrochloride of the antibiotic, after being dried in vacuo, is a pure white amorphous powder. The yield is 0.25 gram.

According to paper-chromatographic examination the hydrochloride of the antibiotic lemacidine so obtained is a mixture of three probably closely allied compounds (B1, B2 and B3). By using e.g. as solvent system a mixture of 3 parts of ethanol and 1 part of water and to which 0.2% of sodium chloride has been added, and taking the $R_f$-value ($=R_B$) of the fastest flowing compound B3 (reference substance) as being equal to 1, the other two components B1 and B2 have the $R_B$-values 0.34 and 0.61 respectively.

*Example 6*

The new antibiotic can be obtained in the form of the free base from its sulfate either by means of barium hydroxide or with the use of a weakly basic ion-exchanger. In the former case, there is added, for example to a solution of 1 gram of the sulfate of the antibiotic obtained as described in Example 2, in 5 cc. of water a small excess of a warm saturated solution of barium hydroxide, that is to say, a sufficient quantity of barium hydroxide to give the reaction mixture a pH value of about 9. The excess of barium hydroxide is then immediately neutralized by introducing carbon dioxide into the solution. In order to convert the barium bicarbonate formed, the reaction mixture is maintained for a few minutes in a water bath at 60° C., and then the precipitated barium carbonate and the barium sulfate are separated by centrifuging. The free base of the antibiotic is isolated from the supernatent water-clear alkaline centrifuge solution by freeze drying. It is a white powder which is soluble in water to give a strongly alkaline reaction and is insoluble in organic solvents. The yield is 0.5 gram.

The free base can be obtained with the aid of a weakly basic ion-exchanger in the following manner:

An aqueous solution of about 20% strength of 0.2 gram of the crude sulfate of the antibiotic, obtained as described in Example 2, is percolated through a column of the weakly basic ion-exchanger known as Dowex-2, about 30 times the weight of the ion-exchange resin, which has been repeatedly washed with dilute hydrochloric acid, water, dilute caustic soda solution and water in that order, are used. The column charged with the sulfate solution is subsequently washed with water, whereby the base is easily eluted. The eluate is advantageously lyophilized as described above to obtain the base. The yield is 0.65 gram. The base is a white amorphous powder.

*Example 7*

A culture solution of antibiotic lemacidine, which has been obtained as described in Example 1 and freed from mycelium, is slowly filtered through a column of a weakly acid ion exchange resin containing carboxyl groups, for example, Amberlite IRC-50, 100 grams of the exchanger in the H-form being used per liter of antibiotic solution and the rate of flow being adjusted to about 5 liters per hour. The antibiotic lemacidine is adsorbed as well as inactive accompanying substances which are in part of a strong brown color. The solution which issues and has a pH value of 3 to 3.5 exhibits a very low antibiotic activity. The Amberlite column is then washed with a quantity of distilled water amounting to ⅕ of the volume of the culture solution subjected to filtration, whereby a part of the inactive colored accompanying material is removed, but the antibiotic itself is not eluted. In order to obtain the antibiotic from the adsorbate, an aqueous solution of 0.2 N-hydrochloric acid is passed through the prewashed column in a quantity amounting to ¼ of the volume of culture solution used. The strongly acid eluate is neutralized either by means of a caustic soda solution or with the aid of a weakly basic ion-exchanger. The solution so obtained can be used as such or, after being concentrated in vacuo at a low temperature, used as a starting solution for making a more enriched preparation of antibiotic lemacidine, for example, by the method described in Examples 2, 3 or 4.

*Example 8*

The pantothenate of the antibiotic lemacidine can be obtained e.g. from the sulfate prepared as described in Example 2. To this end, a solution of 1.0 g. of sulfate in 10 cc. of water is admixed with 8.0 cc. of a 10% aqueous solution of calcium pantothenate, the precipitated calcium sulfate is filtered off or centrifuged off, and the filtrate or centrifugate is lyophilized or evaporated to dryness under reduced pressure. The dry residue of the pantothenate of the antibiotic lemacidine is a white amorphous powder which readily dissolves in water.

In a similar manner there can be prepared other salts of the antibiotic lemacidine with organic acids e.g. with L(+) ascorbic acid or with amino acids, such as L(—) leucine or L(—) methionine. It is of advantage to use as starting material the free base of the antibiotic as prepared by the method of Example 6, mixing the concentrated aqueous solution with a warm saturated solution of the organic acid, and using for each gram of the base 1.2 g. of ascorbic acid, or 0.9 g. of leucine, or 1.05 g. of methionine.

What is claimed is:

1. Process for the manufacture of a new antibiotic, which comprises aerobically cultivating *Streptomyces venezuelae* A 9692 in an aqueous nutrient solution containing a source of carbon and of nitrogen and inorganic salts until the solution has a substantial antibiotic action, and isolating antibiotic from the nutrient solution.

2. Process according to claim 1, wherein the antibiotic is isolated from the culture filtrate by adsorption at a weakly alkaline pH, advantageously at a pH of 7.5-8.

3. Process according to claim 1, wherein the antibiotic is extracted from the adsorbate by means of an acid eluant.

4. Process according to claim 1, wherein the elution liquid used in a mixture of equal parts of methanol and 1 N-formic acid.

5. Process according to claim 1, wherein prior to the extraction of the antibiotic, the absorbate is washed with an organic solvent miscible with water, to remove inactive accompanying substances.

6. Process according to claim 1, wherein the eluate is concentrated at a low temperature under reduced pressure, and from the concentrate the antibiotic is precipitated with acetone.

7. Process according to claim 1, wherein the antibiotic is reacted in an aqueous solution with the watersoluble salt of an azo dyestuff containing sulfonic acid groups, to convert it into a dyestuff salt which is sparingly soluble in water, and such salt is isolated.

8. Process according to claim 1, wherein the antibiotic is precipitated in the aqueous medium by means of picrolonic acid, and the precipitate is isolated.

9. Process according to claim 1, wherein the antibiotic is absorbed from the nutrient solution by means of a weakly acid ion exchanger which contains carboxyl groups and is in the H-form.

10. Process according to claim 9, wherein the antibiotic is eluted from the weakly acid ion exchanger which contains carboxyl groups by means of dilute hydrochloric acid and the eluate fractions with the antibiotic activity are neutralized.

11. A member selected from the group consisting of the antibiotic lemacidine, a colorless basic, water-soluble substance, insoluble in organic solvents, capable of forming salts with acids, the hydrochloride of which is a crystalline substance easily soluble in water and methanol, having the optional rotation $[\alpha]_D^{20} = +24.4°$ (c.=1.0 in water) and giving in the elementary analysis the following values:

| | Percent |
|---|---|
| Carbon | 37.3 |
| Hydrogen | 7.0 |
| Nitrogen | 16.8 |
| Chlorine | 18.1 | the sulfate of which is a colorless substance easily soluble in water and formamide, having the optical rotation $[\alpha]_D^{27} = +56°$ (c.=0.59 in water) and giving in the elementary analysis the following results:

| | Percent |
|---|---|
| Carbon | 35.0 |
| Hydrogen | 6.9 |
| Nitrogen | 11.6 |
| Sulfur | 8.3 | the helianthate, picrate, styphnate, picronolate and reineckate of which are sparingly soluble in water, the yellow colored layered lamellae or needles of the helianthate melting at 202–203° C. with decomposition, the yellow rodlets of the picronolate at 202° C. and the irregular plates of the reineckate at 198-200° C., and acid addition salts thereof, said lemacidine having been prepared by the process of claim 1.

12. Acid addition salts of the antibiotic lemacidine claimed in claim 11, with a member selected from the group consisting of L(—) ascorbic acid, L(—) leucine, L(—) methionine, pantothenic acid, hydrochloric acid and sulfuric acid.

References Cited in the file of this patent

UNITED STATES PATENTS 2,483,871    Bartz    Oct. 4, 1949

OTHER REFERENCES

Analytical Chemistry, February 1948, p. 97.
Antibiotics Annual, 1956–57, pp. 947–953, pub. 1957, Med. Encyclo., Inc., New York city.
Chemical Abstracts, vol. 51, 1957, pp. 15696–15697.
Antibiotiki, vol. 2, No. 1, pp. 10–17, 1957.
Antibiotiki, 1959, No. 2, pp. 9–13.

UNITED STATES PATENT OFFICE
CERTIFICATE OF CORRECTION

Patent No. 3,089,816                                      May 14, 1963

Ernst Gaeumann et al.

It is hereby certified that error appears in the above numbered patent requiring correction and that the said Letters Patent should read as corrected below.

Column 12, line 2, for "in" read -- is --; line 5, for "absorbate" read -- adsorbate --; line 21, for "absorbed" read -- adsorbed --; line 34, for "optional" read -- optical --; same column 12, line 44, for "0.59" read -- 0.95 --.

Signed and sealed this 5th day of May 1964.

(SEAL)
Attest:
ERNEST W. SWIDER

Attesting Officer

EDWARD J. BRENNER
Commissioner of Patents